(12) United States Patent
Borowy

(10) Patent No.: US 8,532,918 B2
(45) Date of Patent: Sep. 10, 2013

(54) SYSTEM AND METHOD FOR VEHICLE POSITION SENSING WITH HELICAL WINDINGS

(75) Inventor: Bogdan S. Borowy, San Diego, CA (US)

(73) Assignee: General Atomics, San Diego, CA (US)

( * ) Notice: Subject to any disclaimer, the term of this patent is extended or adjusted under 35 U.S.C. 154(b) by 633 days.

(21) Appl. No.: 12/404,161

(22) Filed: Mar. 13, 2009

(65) Prior Publication Data
US 2010/0235090 A1  Sep. 16, 2010

(51) Int. Cl.
*G01C 21/00* (2006.01)
*H04B 5/00* (2006.01)

(52) U.S. Cl.
USPC .......................................... 701/408; 455/41.1

(58) Field of Classification Search
None
See application file for complete search history.

(56) References Cited

U.S. PATENT DOCUMENTS

| | | | | |
|---|---|---|---|---|
| 3,748,466 A * | 7/1973 | Sibley et al. | ................ | 246/63 C |
| 3,907,238 A * | 9/1975 | Sibley et al. | ................ | 246/34 R |
| 3,991,958 A * | 11/1976 | Sibley et al. | ................ | 246/34 R |
| 4,061,089 A | 12/1977 | Sawyer | | |
| 5,628,252 A * | 5/1997 | Kuznetsov | ................ | 104/284 |
| 5,722,326 A | 3/1998 | Post | | |
| 6,011,508 A * | 1/2000 | Perreault et al. | ............... | 342/350 |
| 6,044,770 A | 4/2000 | Davey et al. | | |
| 6,085,663 A | 7/2000 | Powell et al. | | |
| 6,129,025 A | 10/2000 | Minakami et al. | | |
| 6,152,045 A | 11/2000 | Powell et al. | | |
| 6,510,799 B2 | 1/2003 | Lamb et al. | | |
| 6,781,524 B1 * | 8/2004 | Clark et al. | ................... | 340/933 |
| 6,827,022 B2 | 12/2004 | van den Bergh et al. | | |
| 7,158,754 B2 * | 1/2007 | Anderson | ................... | 455/41.1 |
| 7,971,341 B2 * | 7/2011 | Dukesherer et al. | ............ | 29/606 |
| 8,068,984 B2 * | 11/2011 | Smith et al. | ................... | 701/472 |
| 2004/0035315 A1 | 2/2004 | Richards | | |
| 2010/0060269 A1 * | 3/2010 | Schmid | .................... | 324/207.11 |

\* cited by examiner

*Primary Examiner* — Mussa A Shaawat
*Assistant Examiner* — Ariel Yu
(74) *Attorney, Agent, or Firm* — Nydegger & Associates

(57) ABSTRACT

A system and method are provided for determining the position of a vehicle on a guideway. For operation, the vehicle carries a magnetic array having a wavelength "$\lambda$". Further, the guideway includes a propulsion winding for carrying a propulsion current. Also, the guideway is provided with a position winding that has the same wavelength "$\lambda$" and includes two helical wires that are displaced from each other by "$\lambda/4$". Importantly, a transmitter is located on the vehicle for emitting a position current that interacts with the position winding to generate a return signal from each helical wire. Also, the system includes a processor for receiving and evaluating the return signals to determine the position of the vehicle on the guideway. As a result, the determined position is used to maximize the interaction of the propulsion current with the magnetic array for propulsion of the vehicle.

20 Claims, 3 Drawing Sheets

SYSTEM AND METHOD FOR VEHICLE POSITION SENSING WITH HELICAL WINDINGS

FIELD OF THE INVENTION

The present invention pertains generally to systems for passively sensing the position of a magnetically levitated (MAGLEV) vehicle on a guideway. More particularly, the present invention pertains to position sensing systems that incorporate a position winding on the guideway to receive a signal emitted from the vehicle. The present invention is particularly, but not exclusively, useful as a position sensing system that communicates a high frequency signal from the vehicle through the position winding to a processor for determining the position of the vehicle on the guideway in order to maximize efficient propulsion of the vehicle.

BACKGROUND OF THE INVENTION

Magnetic levitation systems, often called MAGLEV systems, use magnetic fields to levitate and propel a vehicle over a stationary guideway. Specifically, linear synchronous motor (LSM) windings mounted on a track interacts with a magnet array mounted on the vehicle to generate propulsion of the vehicle. In order to use the LSM windings to accelerate, decelerate and maintain the vehicle at a constant speed, the phase, amplitude and frequency of the currents in the LSM windings must be accurately controlled at all times. Specifically, the propulsion current passing through the LSM windings must be synchronized with respect to the position of the vehicle. Therefore, it is extremely important that the location of the vehicle with respect to the track, and the windings therein, be monitored and communicated to the propulsion control system.

Currently, optical sensors exist for determining the location of MAGLEV vehicles relative to their guideways. However, these optical sensors require use of a "piano key" tape that must be maintained clean, dry and in good condition. Otherwise, accidental pulses are generated by the optical sensors which lead to errors in LSM magnet flux position detection that result in erroneous operation of the propulsion of the MAGLEV vehicle.

In light of the above, it is an object of the present invention to provide systems suitable for the purposes of determining the position of a vehicle over a guideway that are stable and accurate. It is another object of the present invention to provide a vehicle position determining system that relies on passive sensing. It is yet another object of the present invention to provide a MAGLEV vehicle position sensing system that includes a position winding for communicating signals indicative of the position of the vehicle to a system processor. Still another object of the present invention is to provide a MAGLEV vehicle position sensing system that can be used to optimize the interaction of the propulsion current in the propulsion winding along the guideway with the magnetic array on the vehicle, for propulsion of the vehicle. It is still another object of the present invention to provide a MAGLEV vehicle position sensing system that operates in all weather conditions. It is another object of the present invention to provide a MAGLEV vehicle position sensing system that works at all operational speeds. Yet another object of the present invention is to provide a MAGLEV vehicle position sensing system which consumes low amounts of power, is easy to use, relatively simple to implement, and comparatively cost effective.

SUMMARY OF THE INVENTION

The present invention is directed to a system for determining the position of a MAGLEV vehicle along a stationary guideway. In functional overview, the system is designed to determine the vehicle position so that the proper phase, amplitude and frequency of the currents in the LSM windings may be accurately controlled at all times to maximize their interaction with the magnetic array on the vehicle for optimal propulsion of the vehicle.

For the system, an array of permanent magnets with a wavelength "$\lambda$", such as a Halbach array, is mounted on the vehicle. Further, a propulsion winding is positioned on the guideway for carrying a propulsion current. Structurally, the propulsion winding includes three coils and has a series of sections, with each section having a wavelength "$\lambda$". Further, the three coils are linearly aligned along the guideway, and appear once in each section. With this arrangement, each pair of adjacent coils has a phase difference of "$\lambda/3$".

Also, the system incorporates a position winding located along the length of the guideway. For the present invention, the position winding has the same wavelength "$\lambda$" and includes two pairs of helical wires wound about a center round core. Operationally, each pair of helical wires acts as a signal receiver line. Structurally, the four helical wires are spatially displaced from each other by "$\lambda/4$". In certain embodiments, the center round core has a diameter of about 0.5 to 0.625 inches and comprises an insulating material such as fiberglass. Further, in these embodiments, the helical wires are comprised of twelve gauge stranded copper wire. For each component of the system, "$\lambda$" is preferably approximately 17 inches.

Also, the system includes a transmitter, such as a drive coil, that is located on the vehicle for emitting a position current. In certain embodiments, the position current is a narrow-band high-frequency current with a frequency of about 100 KHz. Importantly, the position current Interacts with the helical wires in the position winding to generate return signals from each helical wire. In order to determine the position of the vehicle, the system includes a processor for receiving and evaluating the two return signals in each signal receiver line. After the position of the vehicle on the guideway is determined, the processor can control the propulsion current to maximize its interaction with the magnetic array on the vehicle for optimal propulsion of the vehicle.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
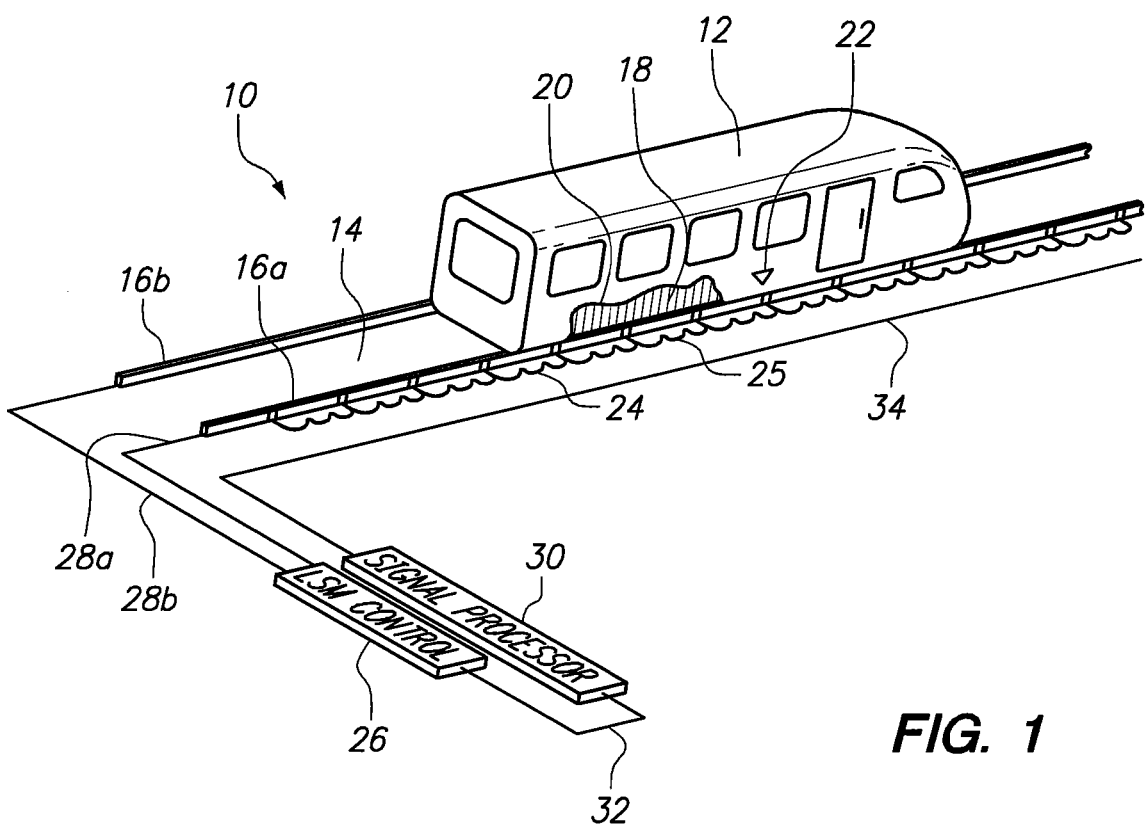
FIG. 1 is a perspective view of a position sensing system for a MAGLEV vehicle traveling along a guideway.

Referring to FIG. 1, a position sensing system in accordance with the present invention is shown and generally designated 10. As shown in FIG. 1, the system 10 includes a MAGLEV vehicle 12 provided for levitation over and travel along a guideway 14. Although a vehicle 12 is shown for the system 10, it is to be appreciated that the system 10 can levitate and propel other objects and is not limited to the levitation and propulsion of manned vehicles. In any case, the vehicle 12 will travel along rails 16 in the guideway 14, of which the rails 16a and 16b are exemplary. Also, the vehicle 12 will include a linear array 18 of magnets 20 that are affixed to, or mounted on, the vehicle 12. Further, the vehicle 12 is provided with a transmitter 22 for emitting a position current.

As shown in FIG. 1, the guideway 14 includes a propulsion winding 24 for carrying a propulsion current. As shown, the propulsion winding 24 includes a plurality of successive sections 25. Further, the propulsion winding 24 is connected to a control 26 for a Linear Synchronous Motor (LSM) (not shown). More specifically, the LSM control 26 is used to move the vehicle 12 in a manner well known in the pertinent art. This propulsion of the vehicle 12 is possible, due to connections between LSM control 26 and the rail 16a via line 28a, and/or rail 16b via line 28b. Importantly, for the system 10 of the present invention, the LSM control 26 uses input from a signal processor 30 for its operation. This interconnection is accomplished by line 32 shown between the signal processor 30 and the LSM control 26 in FIG. 1. As shown in FIG. 1, the signal processor 30 is connected to a position winding 34, and may receive signals from the position winding 34 for input to the control 30.

Figure 2:
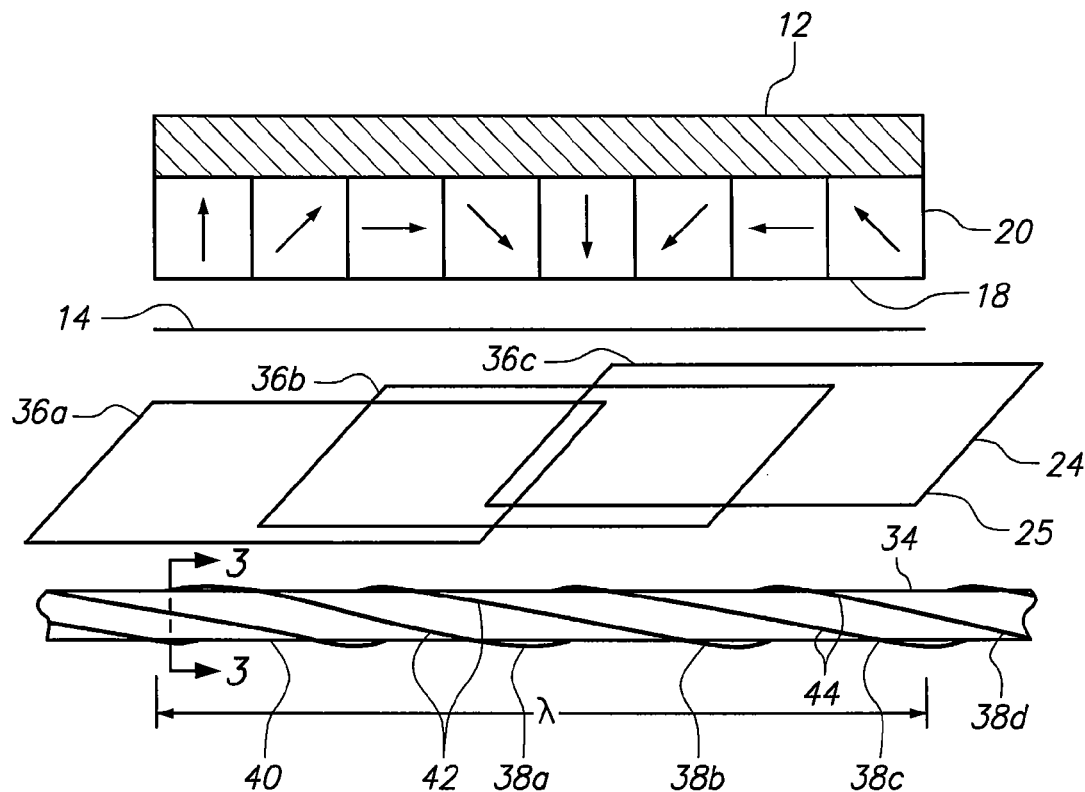
FIG. 2 is a schematic view of the magnets, propulsion windings, and position winding shown in FIG. 1 in accordance with the present invention.

Referring now to FIG. 2, the structure of the linear array 18 of magnets 20 and the associated propulsion winding 24 and position winding 34 are shown in FIG. 2. In FIG. 2, the illustrated magnets 20 constitutes a wavelength, λ, of a Halbach array 18. As shown in FIG. 2, for one wavelength, the Halbach array 18 has a set of eight magnets 20 (each shown with its magnetic field vector) arranged linearly about the direction of the guideway 14. It is to be appreciated that because of the arrangement of the magnets 20 in the Halbach array 18, the orientation of the magnetic field (i.e. the field vector) rotates along the guideway 14. It is to be further appreciated that within the plane of the page, the vertical component of the magnetic field varies sinusoidally along the guideway 14. FIG. 2 shows the wavelength, λ, of this sinusoidal variation.

It is to be appreciated that a number of configurations for establishing one or more wavelengths, λ, of magnetic field along the guideway 14 may be used. For example, four, eight, twelve, sixteen or some other multiple of four magnets 20 can be appropriately arranged to establish a magnetic field having a vertical component that varies sinusoidally through one wavelength λ, along the guideway 14. Additionally, one can imagine single strips of magnetic material magnetized to produce one wavelength, λ, of sinusoidally varying magnetic field along the guideway 14. Alternatively, the use of non-permanent magnets, such as electrically energized coils, may be employed to establish one wavelength, λ, of sinusoidally varying magnetic field along the guideway 14.

Further, in FIG. 2, a section 25 of the propulsion winding 24 is shown to include three separate coils 36a, 36b, 36c and to have a wavelength, λ. Specifically, the three coils 36 are linearly aligned in the section 25 such that there is a phase difference of "λ/3" between adjacent coils 36 in each section 25.

As shown in FIG. 2, the position winding 34 is comprised of four helical wires 38a, 38b, 38c, 38d wrapped around a central round core 40. As shown, the helical wires 38 have the same wavelength "λ" as the Halbach array 18 and propulsion winding 24. Operationally, a first pair of helical wires 38a, 38b form a first signal receiver line 42 and a second pair of helical wires 38c, 38d form a second signal receiver line 44. Cross-referencing FIG. 2 with FIG. 3, it can be seen that each helical wire 38 is spatially displaced from the other helical wire 38 in its pair by "λ/4" or ninety degrees. Further, each helical wire 38 is spatially displaced from the other adjacent helical wire 38 by "λ/4". Though not drawn to scale, the center round core 40 of FIGS. 2 and 3 preferably has a diameter of about 0.5 to 0.625 inches and is comprised of an insulating material such as fiberglass. Further, the helical wires 38 are comprised of twelve gauge stranded copper wire. For each component of the system 10, "λ" is preferably approximately seventeen inches.

Figure 3:
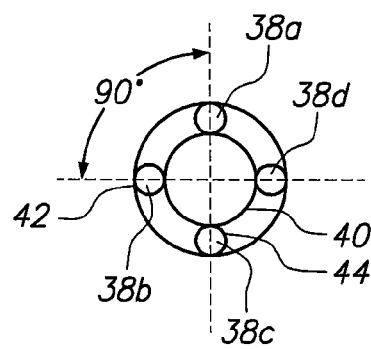
FIG. 3 is a cross sectional view of the position winding taken along line 3-3 in FIG. 2.
Figure 4:
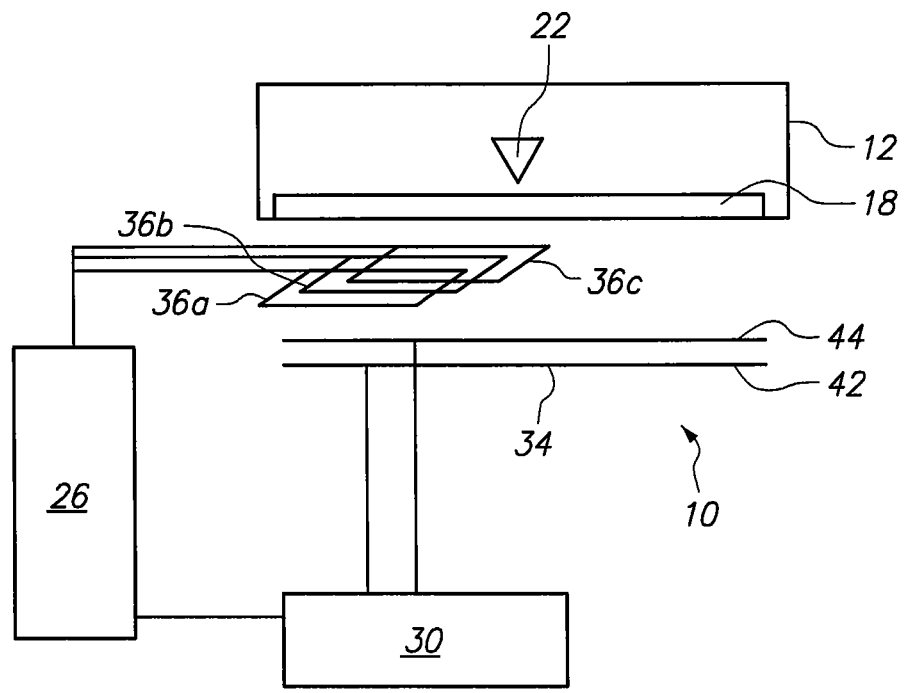
FIG. 4 is a schematic view of the position sensing system shown in FIG. 1 in accordance with the present invention.

Referring now to FIG. 4, the operation of the position sensing system 10 is illustrated. As shown, each coil 36a, 36b, 36c in a section 25 (as shown in FIG. 2) is provided with a propulsion current from the LSM control 26 for interaction with the Halbach array 18 to cause propulsion of the vehicle 12. Further, the LSM control 26 is connected to the signal processor 30. As shown, the signal processor 30 is operatively connected to the two signal receiver lines 42, 44 of the position winding 34, each of which is formed by a pair of helical wires 38 as shown in FIGS. 2 and 3. When the transmitter 22 emits a high frequency position current, the position current interacts with the helical wires 38 in the position winding 34 to generate return signals from each helical wire 38. These return signals are communicated to the processor 30, which receives and evaluates the two return signals from each signal receiver line 42, 44. After the position of the vehicle 12 on the guideway 14 is determined, the processor 30 communicates with the LSM control 26 to control the propulsion current to maximize the interaction of the propulsion current in the propulsion winding 24 along the guideway 14 with the magnetic array on the vehicle 12 for propulsion of the vehicle 12.

Determination of the absolute position of the vehicle 12 by the processor 30 is based on a ratio of the two signals received from each of the signal receiver lines 42, 44. As noted above, the signal receiver lines 42, 44 (i.e., the two pairs of helical wires 38 comprised by the position winding 34) are displaced spatially by "λ/4", where λ is the magnetic array wavelength. When the transmitter 22 emits the high frequency flux signal, it is picked up by the two signal receiver lines 42, 44. The magnitude of the picked up signal in each of the signal receiver lines 42, 44 is:

$$y_A = \Psi_m(g)\sin(2\pi f_c t)\sin\left(\frac{2\pi}{\lambda}x\right)$$

$$y_B = \Psi_m(g)\sin(2\pi f_c t)\sin\left(\frac{2\pi}{\lambda}\left(x+\frac{\lambda}{4}\right)\right) -$$
$$\Psi_m(g)\sin(2\pi f_c t)\sin\left(\frac{2\pi}{\lambda}x + \frac{\pi}{2}\right)$$
$$= \Psi_m(g)\sin(2\pi f_c t)\cos\left(\frac{2\pi}{\lambda}x\right)$$

Where "$f_c$" is carrier frequency of the injected signal, "g" is the varying distance between the transmitter 22 and the helical wire 38, λ is the magnetic array wavelength, and "x" is the vehicle position.

The resulting two signals, $y_A$ and $y_B$ are amplitude modulated signals displaced by ninety degrees. After a known method of demodulation of amplitude modulated signals, by multiplying the modulated signals by the carrier signal and passing through a Low Pass filter, the position dependent signals can be extracted as:

$$y_{A\_Demod} = \Psi_m(g)\sin\left(\frac{2\pi}{\lambda}x\right)$$

$$y_{B\_Demod} = \Psi_m(g)\cos\left(\frac{2\pi}{\lambda}x\right)$$

Then, the vehicle distance dependent magnitude of the flux cancels out when a ratio of the signals is taken into account:

$$\hat{X} = \tan^{-1}\left(\frac{y_{A\_Demod}}{y_{B\_Demod}}\right) = \tan^{-1}\left(\frac{\Psi_m(g)\sin\left(\frac{2\pi}{\lambda}x\right)}{\Psi_m(g)\cos\left(\frac{2\pi}{\lambda}x\right)}\right) = \tan^{-1}\left(\tan\left(\frac{2\pi}{\lambda}x\right)\right) = \frac{2\pi}{\lambda}x$$

As shown, this approach toward position determination is quite straightforward. The position information is independent of speed and can be obtained when the vehicle 12 is not moving, which is impossible for present optical sensors.

Figure 5:
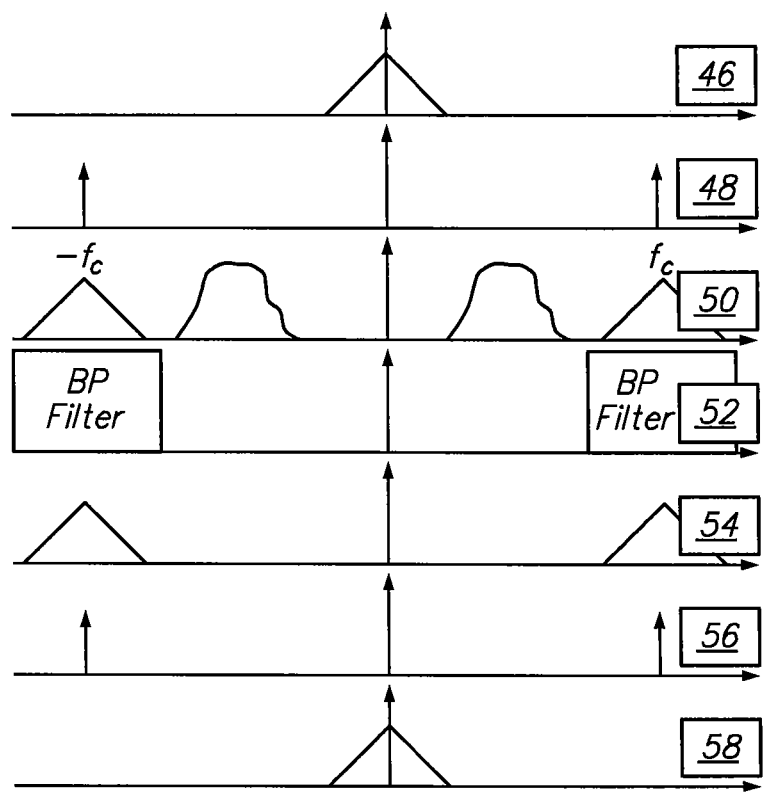
FIG. 5 is a schematic view of the signal processing method performed by the processor in the position sensing system.

In the system 10, extensive filtering is utilized by the processor 30. A contamination of the position signal is mainly caused by high dv/dt values of the Pulse Width Modulation (PWM) signal. A Kalman filter is used as the optimal estimator of the contaminated signal. This approach is used because the amplitude modulation shifts the frequency band of the position signal toward high frequencies, where fewer unwanted signals may be. Referring to FIG. 5, the position signal information occupies the low frequency portion of the spectrum. After the high-frequency transmitter signal of frequency "$f_c$" is modulated with the position signal, the resulting signal is shifted toward the high frequency portion of the spectrum, centered at "$f_c$". If the unwanted PWM harmonics and their sidebands occupy frequency bands outside of the position signal band, they can be filtered out.

As shown in FIG. 5, the low frequency position signal (note that zero frequency is also considered) occupies a band as illustrated at 46. After the signal is modulated by a transmission carrier of a frequency defined as "$f_c$" in 48, the original position is shifted by "$f_c$", as illustrated in 50. At this point, the undesirable noise signal adds to the total signal on the helical wires 38. A band pass filter (BP) can be applied to reject the noise as illustrated at 52 and 54. As a result of demodulation at 56, the cleaned signals at 54 are shifted back to the frequency band (at 58) identical to that of the original position signal. Two other signals around "$2f_c$" are also created in the process of demodulation, but by applying a common low pass filtering, they are nulled. The resulting signals are noise-suppressed, original position, proportional signals.

While the particular System and Method for Vehicle Position Sensing with Helical Windings as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for determining a position of a vehicle along an "x" direction on a guideway which comprises:
   a magnetic array mounted on the vehicle, wherein the array has a wavelength "λ";
   a propulsion winding located on the guideway for carrying a propulsion current provided by a Linear Synchronous Motor (LSM) control for interacting with the magnetic array to cause propulsion of the vehicle;
   a position winding located on the guideway, wherein the position winding has the same wavelength "λ" and the position winding includes a first helical wire and a second helical wire, wherein the first and second helical wires are arranged co-axially about an axis with the axis aligned along the "x" direction and with the first and second helical wires spatially displaced from each other by "λ/4";
   a transmitter located on the vehicle for interacting with the position winding to generate a first return signal from the first helical wire and a second return signal from the second helical wire; and
   a processor connected to the LSM control for receiving and evaluating the first and second return signals to determine position data for the vehicle on the guideway, wherein the position data evaluation is based on a ratio of the first and second return signals to cancel a vehicle distance dependent flux magnitude, and wherein the position data is electronically communicated to the LSM control for use in maximizing an interaction of the propulsion current in the propulsion winding along the guideway with the magnetic array on the vehicle, for optimizing propulsion of the vehicle.

2. A system as recited in claim 1 wherein the interaction of the transmitter with the windings is accomplished using a narrow-band high-frequency position current.

3. A system as recited in claim 2 wherein the position current has a frequency of about 100 KHz.

4. A system as recited in claim 1 wherein the propulsion winding includes at least one section having a wavelength "λ", and each section has three coils linearly aligned along the guideway, with a phase difference of "λ/3" between adjacent coils in the section.

5. A system as recited in claim 1 wherein the first helical wire and the second helical wire are a first pair, and the position winding further comprises a second pair, wherein the respective wires of the first and second pairs are spatially displaced from each adjacent wire in the position winding by "λ/4".

6. A system as recited in claim 5 wherein the position winding further comprises a center round core, and the first and second pairs are wound on the center round core.

7. A system as recited in claim 1 wherein "λ" is approximately 17 inches.

8. A system for determining a position of a vehicle along an "x" direction on a guideway which comprises:
   a magnetic array mounted on the vehicle, wherein the array has a wavelength "λ";
   a propulsion winding located on the guideway for carrying a propulsion current provided by a Linear Synchronous Motor (LSM) control for interacting with the magnetic array to cause propulsion of the vehicle;
   a first helical wire and a second helical wire, with each helical wire being located on the guideway and having the same wavelength "λ", wherein the helical wires are arranged co-axially about an axis with the axis aligned along the "x" direction and with the first and second helical wires spatially displaced from each other by "λ/4";
   a means located on the vehicle for interacting with the helical wires to generate a first return signal from the first helical wire and a second return signal from the second helical wire; and
   a means for receiving and evaluating the first and second return signals connected to the LSM control and used to determine position data for the vehicle on the guideway, wherein the position data evaluation is based on a ratio of the first and second return signals to cancel a vehicle distance dependent flux magnitude, and wherein the position data is electronically communicated to the LSM control for use in maximizing an interaction of the propulsion current in the propulsion winding along the guideway with the magnetic array on the vehicle, for optimizing propulsion of the vehicle.

9. A system as recited in claim 8 wherein the interaction of the means located on the vehicle and the helical wires is accomplished using a narrow-band high-frequency position current.

10. A system as recited in claim 9 wherein the position current has a frequency of about 100 KHz.

11. A system as recited in claim 8 wherein the propulsion winding includes at least one section having a wavelength "$\lambda$", and each section has three coils linearly aligned along the guideway, with a phase difference of "$\lambda/3$" between adjacent coils in the section.

12. A system as recited in claim 8 wherein the first helical wire and the second helical wire are a first pair, and the position winding further comprises a second pair of helical wires, wherein the respective wires of the first and second pairs are spatially displaced from each adjacent wire in the position winding by "$\lambda/4$".

13. A system as recited in claim 12 wherein the position winding further comprises a center round core, and the first and second pairs are wound on the center round core.

14. A system as recited in claim 8 wherein "$\lambda$" is approximately 17 inches.

15. A method for determining a position of a vehicle along an "x" direction on a guideway which comprises the steps of:
mounting a magnetic array on the vehicle, wherein the array has a wavelength "$\lambda$";
locating a propulsion winding on the guideway for carrying a propulsion current provided by a Linear Synchronous Motor (LSM) control for interacting with the magnetic array to cause propulsion of the vehicle;
locating a position winding on the guideway, wherein the position winding has the same wavelength "$\lambda$" wherein the position winding includes a first helical wire and a second helical wire, and wherein the first and second helical wires are arranged co-axially about an axis with the axis aligned along the "x" direction and with the first and second helical wires spatially displaced from each other by "$\lambda/4$";
placing a transmitter on the vehicle to interact with the position winding to generate a first return signal from the first helical wire and a second return signal from the second helical wire; and
receiving and evaluating the first and second return signals with a processor to determine position data for the vehicle on the guideway, wherein the position data evaluation is based on a ratio of the first and second return signals to cancel a vehicle distance dependent flux magnitude, and wherein the position data is electronically communicated to the LSM control for use in maximizing an interaction of the propulsion current in the propulsion winding along the guideway with the magnetic array on the vehicle, for optimizing propulsion of the vehicle.

16. A method as recited in claim 15 wherein the interaction of the transmitter and the position winding is accomplished using a position current, wherein the position current has a frequency of about 100 KHz.

17. A method as recited in claim 15 wherein the propulsion winding includes at least one section having a wavelength "$\lambda$", and each section has three coils linearly aligned along the guideway, with a phase difference of "$\lambda/3$" between adjacent coils in the section.

18. A method as recited in claim 15 wherein the first helical wire and the second helical wire are a first pair, and the position winding further comprises a second pair, wherein the respective wires of the first and second pairs are spatially displaced from each adjacent wire in the position winding by "$\lambda/4$".

19. A method as recited in claim 15 wherein the position winding further comprises a center round core, and the first and second pairs are wound on the center round core.

20. A method as recited in claim 15 wherein "$\lambda$" is approximately 17 inches.

* * * * *